United States Patent [19]

Oleck et al.

[11] Patent Number: 4,490,242

[45] Date of Patent: Dec. 25, 1984

[54] TWO-STAGE HYDROCARBON DEWAXING HYDROTREATING PROCESS

[75] Inventors: Stephen M. Oleck, Moorestown; Robert C. Wilson, Jr., Woodbury, both of N.J.

[73] Assignee: Mobil Oil Corporation, New York, N.Y.

[21] Appl. No.: 579,317

[22] Filed: Jan. 13, 1984

Related U.S. Application Data

[60] Continuation-in-part of Ser. No. 417,765, Sep. 13, 1982, Pat. No. 4,437,976, which is a division of Ser. No. 290,759, Aug. 7, 1981.

[51] Int. Cl.$^3$ .................. C10G 65/02; C10G 45/12
[52] U.S. Cl. ............................. 208/97; 208/216 R
[58] Field of Search ........................... 208/97, 216 R

[56] References Cited

U.S. PATENT DOCUMENTS

| | | | |
|---|---|---|---|
| 3,438,887 | 4/1969 | Morris et al. | 208/87 |
| 3,894,938 | 7/1975 | Gorring et al. | 208/97 |
| 4,181,598 | 1/1980 | Gillespie et al. | 208/58 |
| 4,292,166 | 9/1981 | Gorring et al. | 208/59 |
| 4,313,817 | 2/1982 | Mayer et al. | 208/89 |
| 4,437,976 | 3/1984 | Oleck et al. | 208/97 |

*Primary Examiner*—Delbert E. Gantz
*Assistant Examiner*—O. Chaudhuri
*Attorney, Agent, or Firm*—Alexander J. McKillop; Michael G. Gilman; Van D. Harrison, Jr.

[57] ABSTRACT

The pour point of a hydrocarbon charge stock boiling above about 850° F., is reduced by catalytically dewaxing the charge stock in the presence of a zeolite catalyst and subsequently subjecting at least the liquid portion thereof to hydrotreating in the presence of a hydrotreating catalyst comprising a hydrogenating component and a siliceous porous crystalline material from the class of ZSM-5, ZSM-11, ZSM-23 and ZSM-35 zeolites.

10 Claims, No Drawings

TWO-STAGE HYDROCARBON DEWAXING HYDROTREATING PROCESS

CROSS REFERENCE TO RELATED APPLICATIONS

This is a continuation-in-part of our copending application Ser. No. 417,765, filed Sept. 13, 1982 now U.S. Pat. No. 4,437,976, which is a divisional of copending application Ser. No. 290,759, filed Aug. 7, 1981, both of which are incorporated herein by reference.

NATURE OF THE INVENTION

This invention is concerned with the manufacture of high-quality lubricating oils and in particular is concerned with the catalytic dewaxing and hydrotreating of residua, deasphalted residua, and bright stocks.

PRIOR ART

The refining of petroleum crude oils to obtain lubricant-stocks is based primarily on a series of steps including distillation, solvent refining and dewaxing.

U.S. Pat. No. 4,181,598 describes how such refining techniques are applied to heavy oils such as short residuum and deasphalted residuum. U.S. Pat. No. 4,181,598 is incorporated herein by reference. High quality lube base stock oils are conventionally prepared by refining distillate fractions or the residuum prepared by vacuum distilling a suitable crude oil from which the lighter portion has been removed by distillation in an atmospheric tower. Thus, the charge to the vaccum tower is commonly referred to as a "long residuum", and the residuum from the vacuum tower is distinguished from the starting material by referring to it as the "short residuum".

The vacuum distillate fractions are upgraded by a sequence of unit operations, the first of which is solvent extraction with a solvent selective for aromatic hydrocarbons. This step serves to remove aromatic hydrocarbons of low viscosity index and quality. Various processes have been used in this extraction stage, and these employ solvents such as fulfural, phenol, sulfur dioxide, and others. The short residuum, because it contains most of the asphaltenes of the crude oil, is conventionally treated to remove these asphalt-like constituents prior to solvent extraction to increase the viscosity index.

The raffinate from the solvent extraction step contains paraffins which adversely affect the pour point. Thus, the waxy raffinate, regardless of whether prepared from a distillate fraction or from the short residuum, must be dewaxed. Various dewaxing procedures have been used, and the art has gone in the direction of treatment with a solvent such as MEK/toluene mixtures to remove the wax and prepare a dewaxed raffinate.

U.S. Pat. No. 4,181,598 particularly shows the application of a two stage process to heavy oils. Known unit processes are applied to distillate or short residuum fractions of waxy crude in particular sequence and within limits to prepare lube base stock oils used, for example, in hydraulic fluids, motor oils, turbine oils, marine oils and gear lubricants. The first step after preparation of a distillate fraction of suitable boiling range is extraction with a solvent which is selective for aromatic hydrocarbons, e.g., furfural, phenol, or chlorex, to remove undesirable components of the fraction. With a short residuum fraction, it is required to propane deasphalt the residuum prior to solvent extraction. In some instances, such as with a cylinder stock, solvent extraction of the deasphalted short residuum may be omitted. The raffinate from solvent refining or propane deasphalting a short residuum is then catalytically dewaxed in admixture with hydrogen over a catalyst of an aluminosilicate zeolite having a silica to alumina ratio greater than 12 and a constraint index of 1 to 12. The total effluent from the dewaxer, including hydrogen, is cascaded to the hydrotreater.

Any of the known hydrotreating catalysts consisting of a hydrogenation component on a non-acidic support may be employed in the hydrotreating step. Such catalysts include, for example, cobalt-molybdate or nickel-molybdate on an alumina support. Here again, temperature control is required for production of high quality product, the hydrotreater being operated at 425° to 500° F. with distillate fractions and 500° to 575° F. for residuum fractions.

Example 1 from U.S. Pat. No. 4,181,598 shows conventional dewaxing/hydrotreating to produce premium bright stock from short residuum of Arabian Light crude. Use of the catalyst described herein as applicant's invention in the hydrotreating stage in place of conventional hydrotreating catalyst provides enhanced activity over the conventional process.

Example U.S. Pat. No. 4,181,598 patent illustrates the manufacture, without wax recovery, of premium bright stock from short residuum of Arabian Light crude.

The short residuum, commercially prepared from Arabian Light crude, was propane deasphalted in a commercial unit in such a way as to yield a 1.0 to 1.5% wt. Conradson Carbon Residue PD raffinate. Said PD raffinate was then commercially furfural extracted to give a product which when dewaxed to 20° F. pour point had a Viscosity Index of 95.

Two catalytic reactors were assembled so that the total effluent from the first reactor was passed directly to the inlet of the second reactor. The first reactor was charged with nickel-containing HZSM-5 catalyst for catalytic dewaxing, and the second reactor with a commercial cobalt-moly on alumina hydrotreating catalyst (Harshaw HT-400 catalyst, containing 2.8 wt % CoO and 9.4 wt % $MoO_3$).

The above-described commercial bright stock raffinate was mixed with hydrogen and passed through the tandem reactors above described to produce a dewaxed hydrotreated effluent. Both reactors were run at 1.0 LHSV based on raffinate charge. Reactor pressure was 400 psig $H_2$ with 2500 SCF/B hydrogen circulation (100% hydrogen once-through). An initial temperature requirement of 550° F. was needed in the first reactor to meet pour point specification while the second reactor was held constant at 550° F. The temperature in the catalytic dewaxing reactor was increased 9° to 10° F. per day to maintain the pour point of the dewaxed oil at about 20° F. The end of cycle temperature for the catalytic dewaxer unit was 675° F. The effluent from the catalytic reactors was distilled (topped) to a cut point of 800° F. to meet flash point specifications. The bright stock raffinate charge and product properties are summarized in Table I.

TABLE I

Properties of Hydrodewaxed/Hydrotreated Premium Bright Stock Furfural Raffinate

| Stream | Charge | Product |
|---|---|---|
| Hydrodewaxing Temperature, °F. | — | 550–675 |
| Yield on Raffinate, % volume | 100.00 | 87.8 |
| Product Properties | | |
| Gravity, °API | 25.4 | 24.4 |
| Gravity, Specific at 60° F. | 0.9018 | 0.9076 |
| Pour Point, °F. | 125 | 15 |
| Flash Point, °F. (COC) | — | 550 |
| KV at 40° Centistrokes | — | 475 |
| KV at 100° C. Centistrokes | — | 30.7 |
| KV at 100° F. Centistrokes | — | 550 |
| KV at 210° F. Centistrokes | 29.7 | 31.8 |
| SUS at 100° F. Seconds | — | 2549 |
| SUS at 210° F. Seconds | 141 | 150 |
| Viscosity Index | — | 94 |
| Neutralization No. Mg. KOH/gm | — | 0.09 |
| Carbon Residue, % Wt (RCR) | 0.55 | 0.56 |
| Hydrogen, % Wt | 13.29 | 13.10 |
| Sulfur, % Wt | 1.16 | 1.06 |
| Nitrogen, ppm | 180 | 180 |
| Refractive Index at 20° C. | — | 1.49815 |
| Refractive Index at 70° C. | 1.47701 | 1.48177 |
| Aniline Point, °F. | 251.5 | 242.6 |
| Furfural, ppm | | 1 |
| Bromine Number | — | 0.5 |
| Distillation, °F. | | D1160-1 |
| 5% vol | | 859 |
| 10% vol | | 922 |
| 30% vol | | 1005 |
| 50% vol | | 1046 |
| 70% vol | | 1091 |

It should be noted that this heavy stock has a 125° F. pour point and that the distillation of the product shows a 50% vol. boiling point of 1046° F., i.e., at least 50% of the product is heavier than 1046° F.

Example 2 of U.S. Pat. No. 4,181,598 patent also illustrates conventional dewaxing/hydrotreating of a heavy oil with 70% of the charge stock heavier than 1000° F. The process of applicants' invention described herein will result in lower temperature requirement, i.e., more overall activity.

Example 2 is similar to Example 1 except that the bright stock raffinate of Example 1 was first solvent dewaxed to +45° F. pour point and then catalytically dewaxed and hydrotreated. Thus, all high grade deoiled wax is recovered in this present example.

The bright stock raffinate described in Example 1 was batch solvent dewaxed in the laboratory at 30° F. filter temperature using 3.5 to 1 solvent to oil and two 1 to 1 washes. The solvent was a 50/50 mix of methyl ethyl ketone and toluene. The partially dewaxed raffinate had a pour point of +45° F., simulating addition of foots oil by-product with the solvent dewaxed oil stream prior to further processing. A 7.3% volume yield of wax was obtained which had a satisfactory melting point of 181.5° F., oil content of 0.2% wt and API gravity of 33.7.

The partially dewaxed raffinate was then treated catalytically as in Example 1 except that the start of run temperature of the catalytic dewaxer was 530° F. instead of 550° F., and then topped.

Table II summarizes the properties of the catalytically dewaxed, hydrotreated bright stock after 550° F. hydrotreating and topping. The dewaxed oil yield at 20° F. pour based on charge to the catalytic dewaxer/hydrotreater was 94.5% by volume.

TABLE II

Properties from Combination Solvent Dewaxing/Hydrodewaxing/Hydrotreating Premium Bright Stock Furfural Raffinate

| | Solvent Dewaxed Oil and Foots Oil | Hydrodewaxed Lube Product |
|---|---|---|
| Yield on Raffinate, % volume | 100.0 | 87.8 |
| Properties | | |
| Gravity, °API | 24.7 | 24.4 |
| Gravity, Specific at 60° F. | 0.9059 | 0.9076 |
| Pour Point, °F. | 45 | 15 |
| Flash Point, °F. (COC) | — | 580 |
| KV at 40° Centistrokes | 389 | 482 |
| KV at 100° C. Centistrokes | 29.8 | 31.6 |
| KV at 100° F. Centistrokes | 446 | 558 |
| KV at 210° F. Centistrokes | 30.8 | 32.7 |
| SUS at 100° F. Seconds | 2066 | 2585 |
| SUS at 210° F. Seconds | 146 | 155 |
| Viscosity Index | 107 | 96 |
| Color, ASTM | 5-¾ | 2-½ |
| Neutralization No. Mg. KOH/gm | 0.05 | 0.05 |
| Carbon Residue, % Wt (RCR) | 0.52 | 0.56 |
| Hydrogen, % Wt | 13.06 | 13.01 |
| Sulfur, % Wt | 1.34 | 1.00 |
| Nitrogen, ppm | 110 | 62 |
| Refractive Index at 20° C. | 1.49820 | 1.49887 |
| Refractive Index at 70° C. | 1.48095 | 1.48167 |
| Aniline Point, °F. | 245.4 | 243.5 |
| Furfural, ppm | — | 1 |
| Bromine Number | — | 0.3 |
| Oil Content, % wt | — | — |
| Melting Point, °F. | — | — |
| Distillation Type | D-1160 | D-1160 |
| IBP. °F. | — | — |
| 5 | 919 | 899 |
| 10 | 950 | 931 |
| 30 | 1002 | 992 |
| 50 | — | — |
| 70 | — | — |
| 90 | — | — |
| 95 | — | — |

Typical properties of propane deasphalted residuum (A) and furfural extracted raffinate (B) are shown below.

Both these stocks are candidates for dewaxing.

Arab Light residuum to be made into lube Bright Stock is first propane deasphalted, and the deasphalted oil (PD raffinate) charged to furfural extraction where about 30% is further removed, generating the waxy raffinate charge to dewaxing.

| | (A) Deasphalted Oil | (B) Waxy Raffinate |
|---|---|---|
| Gravity, °API | 22.3 | 25.1 |
| Specific | 0.9212 | 0.9036 |
| Pour Point, °F. | 120 | 120 |
| KV @ 100° C., cs | 33.26 | 29.06 |
| Sulfur, wt % | 1.89 | 1.13 |
| Nitrogen, ppm | 270 | 130 |
| Hydrogen, wt % | | 13.07 |
| Carbon Residue, % wt (RCR) | 0.86 | 0.58 |
| Aniline Point, °F. | 232.5 | 246.5 |
| Refractive Index @ 70° C. | 1.49091 | 1.47820 |
| Furfural, ppm | — | 1 |
| Distillation, D1160 | | |
| IBP °F. | 877 | 837 |
| 5 | 931 | 926 |
| 10 | 946 | 953 |
| 30 | 991 | 1007 |
| 50 | 1016 | 1042 |
| 70 | 1050 | 1068 |
| | 1103 @ 89% | 1112 @ 87% |

SUMMARY OF THE INVENTION

We have now discovered that the aforedescribed processes which when applied to the treatment of heavy oils, and which process incorporates a hydrotreating step subsequent to at least partial catalytic-dewaxing, are improved in the hydrotreating step by including in the hydrotreating catalyst a minor amount of a siliceous porous crystalline material from the class of ZSM-5, ZSM-11, ZSM-23, and ZSM-35 zeolites.

Although the process of this invention is subsequently described as it applies to the catalytic dewaxing and hydro- treating of heavy oils the process is applicable to treating other charge stocks containing petroleum wax such as gas oil fractions boiling between 400° F. and 1000° F.

Accordingly, in brief this invention constitutes the process of reducing the pour point of heavy oils boiling above about 850° F. by catalytically dewaxing such oils in the presence of a zeolite catalyst and subsequently subjecting at least the liquid portion thereof to hydrotreating in the presence of a hydrotreating catalyst and a siliceous porous crystalline material from the class of ZSM-5, ZSM-11, ZSM-23 and ZSM-35 zeolites.

DESCRIPTION OF THE INVENTION

As indicated previously this invention is concerned with a catalytic dewaxing and improved hydrotreating operation which results in the production of an oil having an enhanced V.I. at a given pour point. It should be recognized that there are certain values of pour point which oils must possess to be commercially useful. Although there is a certain amount of flexibility concerning pour point specification, nevertheless, target pour points for products differ depending on whether heavy or light neutral stock or bright stock is being produced. In general, it is necessary that the pour point of the heavy oil of this invention be no higher than about 15° F. The expression heavy oil is intended to include a product typically having the following properties:

|  | Charge | Product |
|---|---|---|
| API Gravity | 25 | 24 |
| Pour Point, °F. | 120 | 15 |
| Viscosity, CS | | |
| Kv at 100° F. | — | 550 |
| Kv at 210° F. | 30 | 32 |
| Boiling Range, °F. | | |
| 5% vol | 926 | 859 |
| 10% vol | 953 | 922 |
| 30% vol | 1007 | 1005 |
| 50% vol | 1042 | 1046 |
| 70% vol | 1068 | 1091 |

The charge stock used in the process of the invention thus includes petroleum oils boiling within the aforenoted range as well as other processed oils. The boiling points referred to are boiling points at atmospheric pressure and may be determined by vacuum assay in the manner known to those skilled in the art.

In a preferred embodiment of this invention a heavy oil isolated by vacuum distilling a suitable crude oil from which the lighter portion has been removed by atmospheric distillation is solvent refined by countercurrent extraction with at least an equal volume (100 vol. %) of a selective solvent such as furfural. It is preferred to use 1.5 to 2.5 volumes of solvent per volume of oil. The raffinate is subjected to catalytic dewaxing by mixing with hydrogen and contacting it at about 500 to about 675° F. with a catalyst which can be of the ZSM-5 type and can have incorporated therein a hydrogen transfer functional component such as nickel, palladium or platinum.

In some instances, it may be desirable to partially dewax the solvent-refined stock by conventional solvent dewaxing techniques prior to catalytic dewaxing. The higher melting point waxes so removed are those of greater hardness and higher market value than the waxes removed in taking the product to a still lower pour point.

In gas oil dewaxing, the dewaxing step is operated at a temperature of about 300°–1000° F., a pressure of 0–2000 psig, and an LHSV of 0.1 to 10 with a hydrogen to hydrocarbon ratio of about 0 to 25:1. This catalytic dewaxing phase of the overall operation is described in U.S. Pat. No. 3,894,938 which is incorporated herein by reference.

In dewaxing the heavy oil of this invention, conditions for the hydrodewaxing step include a temperature between about 500° and about 675° F., a pressure between about 100 and about 3000 psig and preferably between about 200 and about 1000 psig. The liquid hourly space velocity is generally between about 0.1 and about 10 and preferably between about 0.5 and about 4 and the hydrogen to feedstock ratio is generally between about 400 and about 8000 and preferably between about 800 and 4000 standard cubic feet (scf) of hydrogen per barrel of feed. The catalytic dewaxing step of this invention may be conducted by contacting the feed to be dewaxed with a fixed stationary bed of catalyst, or with a transport bed, as desired. A simple and therefore preferred configuration is a trickle-bed operation in which the feed is allowed to trickle through a stationary fixed bed, preferably in the presence of hydrogen. The dewaxing operation usually is initiated at a temperature of about 500° F. This temperature is, of course, raised as the catalyst ages in order to maintain catalytic activity. In general, the run is terminated at an end-of-run temperature of about 675° F., at which time the catalyst may be reactivated by contact at elevated temperature with hydrogen gas, or regenerated by contact with oxygen-containing gas. Catalysts which can be used include those of the ZSM-5 type as set forth in U.S. Pat. Nos. 3,894,938, 4,137,148 and Re. 28, 398. These patents are incorporated herein by reference. The catalyst, particularly if it is of the ZSM-5 type, can have incorporated therein a hydrogen transfer functional component such as nickel, palladium, or platinum in a proportion of 0.05 to 5 weight percent based on the total weight of catalyst.

The product of the catalytic dewaxing step can be fractionated into liquid and gas portions by cooling to a prescribed temperature at an appropriate pressure. The liquid can then be subjected to the hydrotreating step. It is preferred, however, to subject the entire dewaxed product, to the hydrotreating step. In general, hydrotreating conditions include a temperature of 425° to 600° F., preferably 475° to 550° F.; a space velocity (LHSV) of 0.1 to 4.0 volumes of charge oil per volume of catalyst per hour, preferably 0.5 to 1 LHSV; a hydrogen partial pressure of 150–1500 psia preferably 200–500 psia with 500 to 5000 standard cubic feet of hydrogen per barrel of feed (SCF/B), preferably 1500 to 2500 SCF/B. It is preferred to conduct the hydrotreating step by contacting the dewaxed product with the hydrotreating catalyst in a fixed stationary bed.

The composition and use of the hydrotreating catalyst in the hydrotreating step is the feature of this invention. We have determined that incorporating a zeolite selected from the group consisting of ZSM-5, ZSM-11, ZSM-23, and ZSM-35 in the second-stage hydrotreating catalyst results in a further reduction of pour point without significantly impairing the hydrotreating function of the catalyst.

ZSM-5 is described in greater detail in U.S. Pat. Nos. 3,702,886 and Re. 29,948. The entire descriptions contained within those patents, particularly the X-ray diffraction pattern of therein disclosed ZSM-5, are incorporated herein by reference.

ZSM-11 is described in U.S. Pat. No. 3,706,979. That description, and in particular the X-ray diffraction pattern of said ZSM-11, is incorporated herein by reference.

ZSM-23 described in U.S. Pat. No. 4,076,842. The entire content thereof, particularly the specification of the X-ray diffraction pattern of the disclosed zeolite, is incorporated herein by reference.

ZSM-35 is described in U.S. Pat. No. 4,016,245. The description of that zeolite, and particularly the X-ray diffraction pattern thereof, is incorporated herein by reference.

The original cations associated with each of the crystalline aluminosilicate zeolites utilized herein may be replaced by a wide variety of other cations according to techniques well known in the art. Typical replacing cations include hydrogen, ammonium and metal cations, including mixtures of the same. Of the replacing metallic cations, particular preference is given to cations of metals such as rare earth metals, maganese, calcium, as well as metals of Group IIB of the Periodic Table, e.g. zinc, and Group VIII of the Periodic Table, e.g. nickel, platinum and palladium.

Typical ion exchange techniques would be to contact the particular zeolite with a salt of the desired replacing cation. Although a wide variety of salts can be employed, particular preference is given to chlorides, nitrates and sulfates.

Representative ion exchange techniques are disclosed in a wide variety of patents including U.S. Pat. Nos. 3,140,249; 3,130,251; and 3,140,253.

Following contact with solution of the desired replacing cation, the zeolite is then preferably washed with water and dried at a temperature ranging from 150° F. to about 600° F. and thereafter calcined in air or other inert gas at temperatures ranging from about 500° F. to 1500° F. for periods of time ranging from 1 to 48 hours or more. It has been further found that catalyst of improved selectivity and other beneficial properties may be obtained by subjecting the zeolite to treatment with steam at elevated temperature ranging from 500° F. to 1200° F. and preferably 750° F. to 1000° F. The treatment may be accomplished in an atmosphere of 100% steam or an atmosphere consisting of steam and a gas which is substantially inert to the zeolites.

A similar treatment can be accomplished at lower temperatures and elevated pressure, e.g. 350°–700° F. at 10 to about 200 atmospheres.

Prior to use, the zeolites should be dehydrated at least partially. This can be done by heating to a temperature in the range of 200° to 1000° F. in an inert atmosphere, such as air, nitrogen, etc. and at atmospheric or subatmospheric pressures for between 1 and 48 hours. Dehydration can also be performed at lower temperatures merely by using a vacuum, but a longer time is required to obtain sufficient amount of dehydration.

The hydrogenating component utilized in the hydrotreating step of the process can be one or more of the metals ordinarily used for this purpose in the elemental, sulfide or oxide form such as tungsten, molybdenum, nickel, cobalt, or a noble metal such as platinum or palladium. Preferred catalysts are cobalt or nickel in the elemental, sulfide or oxide form each in combination with molybdenum in the elemental, sulfide or oxide form supported on a non-acidic refractory material preferably a non acid one such as alumina.

Although it is within the concept of this invention to use a mixture of the zeolite component and the hydrogenating component in which each component is contained in separate discrete particles forming a mixture of particles, it is preferred to combine the zeolite and the metal into one particle. Accordingly, a preferred method for preparing the catalyst is to blend the zeolite with a refractory inorganic oxide, preferably hydrated alumina, form the composite into extrudates, dry the extrudate and calcine it in an atmosphere such as nitrogen or air. The extrudate may then be exchanged with cations like ammonium and recalcined, prior to impregnation or exchange with hydrogenation type metals such as molybdenum, nickel and cobalt. Drying and calcining subsequent to impregnation completes the preparation.

The catalysts of this invention are typically prepared by extruding a mixture of about 40% or less of unexchanged zeolite (i.e., as crystallized, Na form) and alumina.

The extrudate is dried and then calcined in flowing $N_2$ for three hours at 1000° F. and then in air for three hours at 1000° F.

It is exchanged with $NH_4NO_3$ solution to obtain a product having low sodium content, dried, and recalcined in air for three hours at 1000° F. The extrudate is then impregnated with solutions containing salts of the desired hydrogenation metal components, dried and recalcined at 1000° F.

Generally the zeolite or mixture of zeolites in the finished dried composite will range from about 5 to 40 percent by weight and the amount of hydrogenative metal or metals (in elemental, sulfide, or oxide form) will range between about 0.05 and about 25 percent by weight of the catalyst composition.

What is claimed is:

1. A process for catalytically dewaxing and hydrotreating a waxy hydrocarbon fraction boiling above approximately 850° F. which comprises:
   (a) contacting said fraction with a dewaxing catalyst under conditions sufficient to effect at least a partial dewaxing of said fraction; and
   (b) contacting the reaction product thereby obtained with hydrogen and a hydrotreating catalyst comprising a hydrogenation component and one or more zeolites selected from the group consisting of ZSM-5, ZSM-11, ZSM-23, and ZSM-35 blended with a refractory inorganic oxide to form an extrudate, said extrudate having a metal hydrogenation component present therein in a concentration of metal in elemental oxide, or sulfide form of between about 0.05 and about 25 percent by weight and a concentration of zeolite in said extrudate of between about 5 and about 40 percent by weight.

2. The process of claim 1 wherein said contacting of reaction product is effected at a temperature between about 425° and about 600° F., a hydrogen partial pressure between about 150 and about 1500 psig, an LHSV of between about 0.1 and about 4.0 and between about 500 and about 5000 standard cubic feed of hydrogen per barrel of reaction product.

3. The process of claim 1 wherein said hydrogenation component includes one or more metal components selected from the group consisting of tungsten, molybdenum, nickel, cobalt, platinum and palladium or mixtures and compounds thereof.

4. The process of claim 1 wherein said hydrogenation component comprises molybdenum and either cobalt or nickel in the elemental or oxide or sulfide form.

5. The process of claim 1 wherein said refractory inorganic oxide is alumina.

6. The process of claim 1 wherein said hydrotreating catalyst comprises said hydrogenation component, and said zeolite, each composited in separate particles.

7. The process of claim 1 wherein said zeolite is ZSM-5.

8. The process of claim 1 wherein said zeolite is ZSM-11.

9. The process of claim 1 wherein said zeolite is ZSM-23.

10. The process of claim 1 wherein said zeolite is ZSM-35.

* * * * *

UNITED STATES PATENT AND TRADEMARK OFFICE
CERTIFICATE OF CORRECTION

PATENT NO. : 4,490,242

DATED : December 25, 1984

INVENTOR(S) : Stephen M. Oleck et al

It is certified that error appears in the above-identified patent and that said Letters Patent is hereby corrected as shown below:

```
Column 1, line 42, change "fulfural" to --furfural--.
Column 2, line 30, before "U.S. Pat. No. 4,181,598" insert --Example
    1 of--.
Column 3, line 58, "0.2%" should read --0.28%--.
```

Signed and Sealed this

Thirtieth Day of April 1985

[SEAL]

Attest:

DONALD J. QUIGG

Attesting Officer

Acting Commissioner of Patents and Trademarks